United States Patent [19]

Harrison

[11] 4,171,142

[45] Oct. 16, 1979

[54] LEAK REPAIR CLAMP

[75] Inventor: George W. Harrison, Alvin, Tex.

[73] Assignee: Team, Inc., Alvin, Tex.

[21] Appl. No.: 832,112

[22] Filed: Sep. 12, 1977

Related U.S. Application Data

[63] Continuation-in-part of Ser. No. 682,485, May 3, 1976, Pat. No. 4,049,296.

[51] Int. Cl.² ............................................. F16L 55/16
[52] U.S. Cl. ........................................ 285/10; 285/15; 285/110; 285/111; 285/294; 285/368; 138/99; 277/72 FM; 277/135
[58] Field of Search ................. 285/15, 294, 297, 373, 285/368, 110, 111, 112, 95, 96, 106, 10, 337, 351, DIG. 18; 277/59, 71, 70, 79, 152, 135, 72 FM; 138/99

[56] References Cited

U.S. PATENT DOCUMENTS

| | | | |
|---|---|---|---|
| 333,011 | 12/1885 | Hoeveler | 285/294 X |
| 1,590,580 | 6/1926 | Hume | 285/10 |
| 1,816,293 | 7/1931 | Oberhuber | 285/368 X |
| 2,012,049 | 8/1935 | Mercier | 277/135 X |
| 2,206,405 | 7/1940 | King | 285/294 |
| 2,778,662 | 1/1957 | Smith | 285/373 X |
| 2,784,991 | 3/1957 | Newell et al. | 285/373 |
| 3,145,035 | 8/1964 | Hanback | 285/110 |
| 3,334,926 | 8/1967 | Faccou | 285/110 |
| 3,550,638 | 12/1970 | Smith | 138/99 |
| 4,049,296 | 9/1977 | Harrison | 285/15 |

Primary Examiner—Thomas F. Callaghan
Assistant Examiner—Carl F. Pietruszka
Attorney, Agent, or Firm—Guy E. Matthews

[57] ABSTRACT

A leak repair clamp for pipe and pipe flanges includes a frame having a plurality of segments positionable in end-to-end relation around the pipe. Each segment includes spaced parallel annular lips flaring from its inner periphery with each lip being an integral part of the segment and having a bent tip portion extending toward the matching oppositely positioned tip portion of the opposite lip. A connecting means is used to connect the segments together in end-to-end relation, the lips extending from the segments to thus form an annular recess around the pipe when the segments are connected. An access means is provided in the frame to permit passage of a liquid sealant into the recess and the lips direct flow of the sealant into direct contact with the pipe to form a self-energizing seal between the lips and pipe.

11 Claims, 8 Drawing Figures

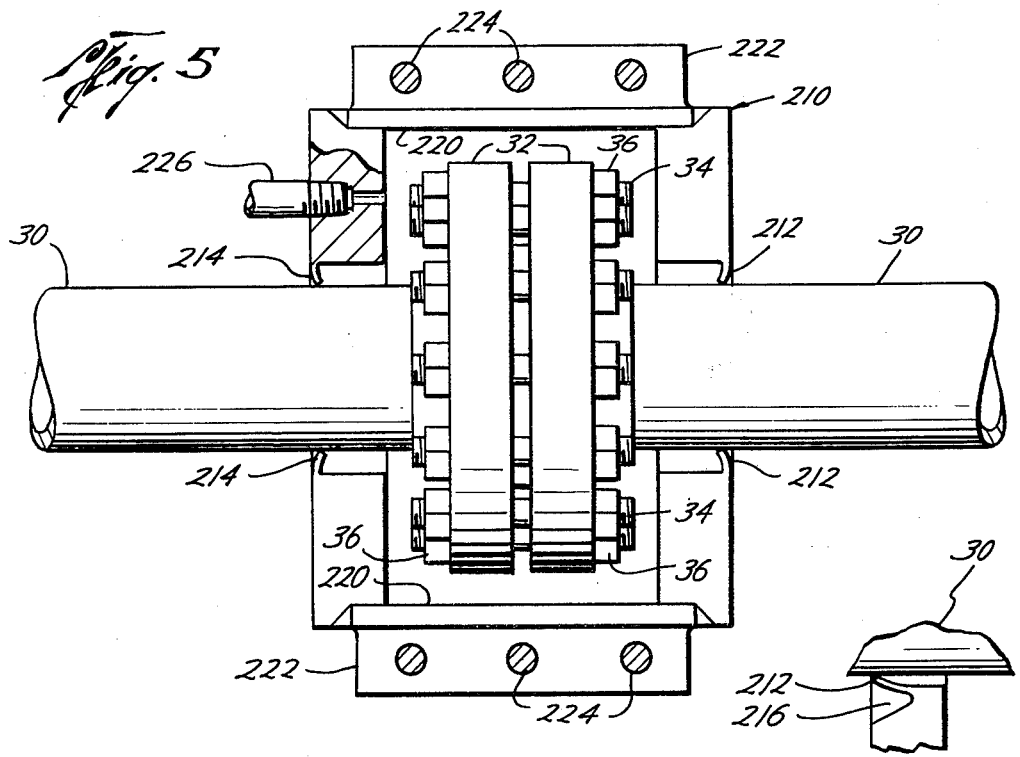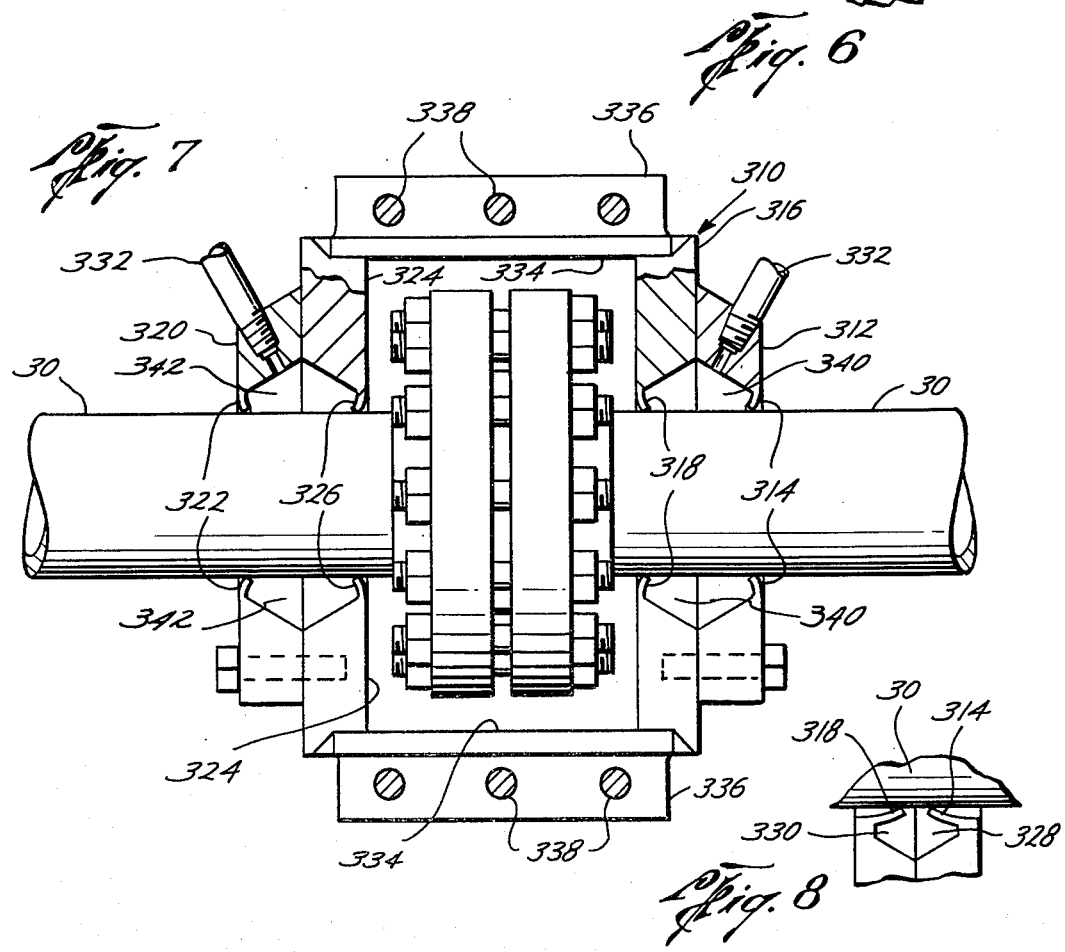

LEAK REPAIR CLAMP

This application is a continuation-in-part of my earlier application Ser. No. 682,485, filed May 3, 1976 and now U.S. Pat. No. 4,049,296.

BACKGROUND OF THE INVENTION

This invention relates generally to means for repairing pipeline leaks and, more particularly, to a leak repair clamp for sealing leaking flange pipe couplings, valve bonnet flanges, or leaks through the exterior of a pipe wall.

Flanged pipe couplings are widely used for connecting sections of pipe which operate in moderate to high pressures. Various configurations of seals are utilized between the flanges. One of the most common configurations is a raised face on the inner portion of each of the flanges with an annular gasket being placed between the raised faces. When the flanges are bolted together the raised faces compress the gasket material to form a seal.

Leaks often begin in such flange pipe couplings because of deterioration of the gasket material, shifting of the pipe and for other reasons. Similarly, a leak may occur in the outer wall of a pipe section due to a defect in the manufacture of the pipe or because of damage due to the pipe during or after installation. Such leaks must be repaired and often in the past the pipeline had to be shut down and drained of its contents before repair could be effected.

Pipe flange repair clamps for sealing the leak between pipe flanges are known in the prior art and some examples are those disclosed in U.S. Pat. Nos. 866,395 and 3,152,816 or in my U.S. pending patent application, Ser. No. 682,485. However, some of the pipe flange repair clamps are extremely complex and have a number of movable and adjustable parts that make the clamp expensive and difficult to utilize. Moreover, such pipe flange repair clamps normally embody an elastomeric material for centering the clamps around the pipe, pipe flanges and the like which also provide an initial sealing arrangement between the pipe and clamp. Such elastomeric seals are fine in most situations, but may be adversely affected in certain situations, such as when the leaking fluid is an acid or at a high temperature and pressure which effects the life of the material. To solve some of these problems, the elastomeric material can be specially selected, but this still does not solve the compression set properties of the material which leads to seal failure.

Accordingly, one of the primary objectives of the present invention is to provide a repair clamp for pipe and pipe flanges and the like which utilizes a self-energizing seal.

Another object of the present invention is to provide a leak repair clamp for pipe and pipe flanges and the like that centers the clamp around the pipe when connected thereto.

Another object of the present invention is to provide a leak repair clamp for pipe and pipe flanges and the like that receives a liquid sealant and directs the flow of the liquid sealant into contact with the pipe to thereby provide a self-energizing seal between the clamp and the pipe.

Another feature of the present invention is to provide a repair clamp for pipe and pipe flanges and the like that utilizes a lip which is an integral part of the clamp and formed to direct a liquid sealant into contact with the pipe.

Yet another feature of the present invention is to provide a simple clamp that can be utilized with minor modifications for sealing leaks in pipelines and pipeline sections and flanges.

SUMMARY OF THE INVENTION

The present invention remedies the problems of the prior art by providing a leak repair clamp for pipe and pipe flanges, valve bonnet flanges and the like. The clamp includes a divided clamp frame made up of a plurality of frame segments positionable in end-to-end relation about the pipe. Each segment has spaced parallel annular lips flaring from its inner periphery with each lip being an integral part of the segment and having a tip portion bent to extend toward the other tip portion of the oppositely positioned spaced annular lip. Means are used to connect the frame segments to one another when positioned in end-to-end relation so that the spaced annular lips extending longitudinally on the interior of each pipe segment aligns with the next adjacent end-to-end lip to form a pair of circumferential spaced lips having a recess therebetween defined by the interior of the flange segments, the lips and the pipeline member. Access means are provided in the frame to permit passage of a liquid sealant into the recess with the lips being used to direct flow of the sealant into contact with the pipe to form a self-energizing seal between the lips and pipe.

BRIEF DESCRIPTION OF THE DRAWINGS

Other objects and advantages of the invention will become apparent upon reading the following detailed description and upon reference to the drawings, in which:

FIG. 5 is a detailed vertical cross-sectional view of a third leak repair clamp constructed according to the present invention mounted on a pipeline to seal a pipe flange leak.

FIG. 6 is a fragmentary vertical cross-sectional view of a modification to the third leak repair clamp shown in FIG. 5.

FIG. 7 is a detailed vertical cross-sectional view of a fourth leak repair clamp constructed according to the present invention mounted on a pipeline to seal a pipe flange leak.

FIG. 8 is a fragmentary vertical cross-sectional view of a modification to the fourth leak repair clamp shown in FIG. 7.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

DETAILED DESCRIPTION OF THE INVENTION

Figure 1:
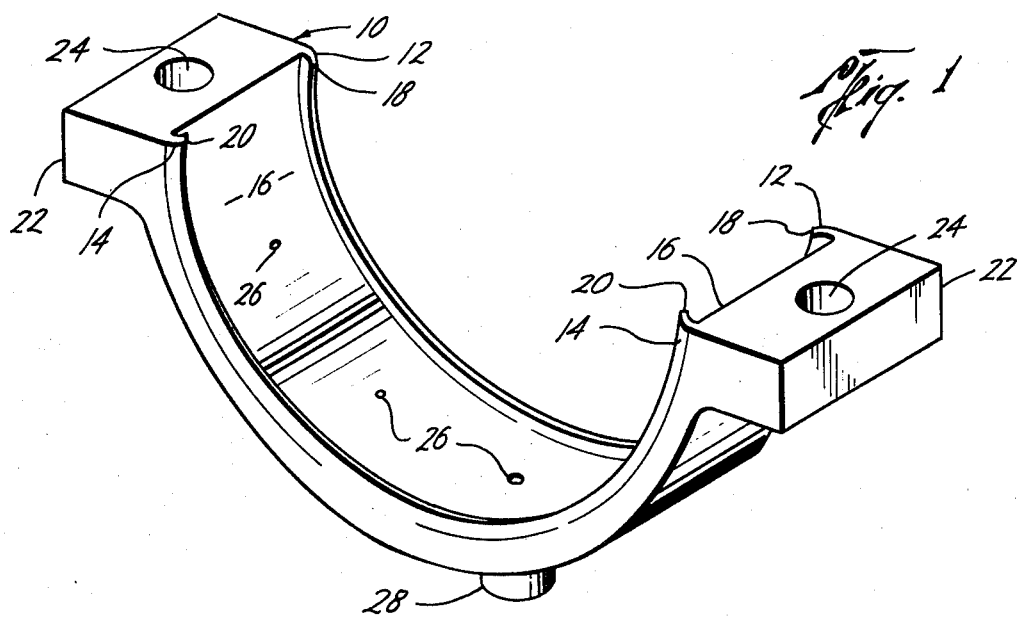
FIG. 1 is a perspective view of a frame segment used in a leak repair clamp constructed according to the present invention.

Referring now to FIG. 1, a perspective view of a portion of a leak repair clamp constructed according to the present invention for pipe and pipe flanges and the like is shown. The clamp comprises a frame constructed from a plurality of frame segments 10 which are positionable in end-to-end relation about the pipe and pipe flanges and the like, which is preferably semi-circular in shape. Each segment 10 has spaced parallel annular lips 12 and 14 that flare from the inner periphery 16. Each lip 12 and 14 is an integral part of each segment 10 and has a tip portion 18 and 20 bent over in order to extend toward the other tip portion. That is, first tip portion 18 of first lip 12 is bent over in order to extend toward second lip 14 and second tip portion 20 of second lip 14 is bent over in order to extend toward first lip 12.

Means are mounted to each segment 10 for connecting the frame segments to one another when positioned in end-to-end relation. Preferably, this connecting means is an end flange 22 positioned on each end of semi-circular frame segment 10 which has apertures or bolt holes 24 extending therethrough. Thus, when connecting segments 10 to one another, the spaced lips 12 and 14 extend from frame segments 10 to form an annular recess around the pipe and pipe flange and the like.

Access means are provided in the frame for permitting passage of a liquid sealant into the recess. Preferably, the access means are provided on each frame segment 10 and is a plurality of radial ports or passageways 26 extending from the outside of the segment to the recess with a nipple 28 for each port 26 mounted to the segment. As liquid sealant is injected into the recess, lips 12 and 14 direct or channel the flow into contact with the pipe and pipe flange and the like to form a self-energizing seal between the lips and pipe. That is, the sealant will force lips 12 and 14 into stronger engagement with the pipe and pipe flanges and the like when the leak pressure pushes against the sealant.

Figure 2:
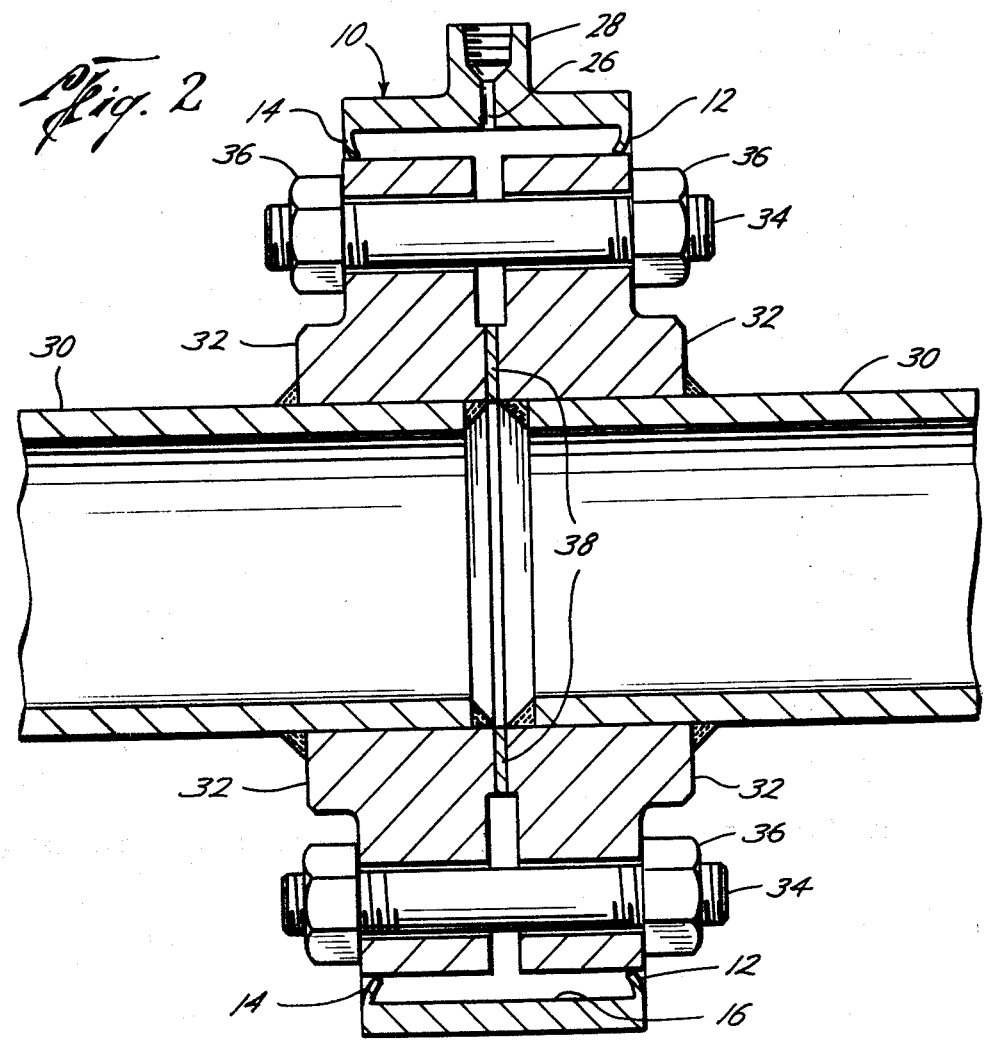
FIG. 2 is a detailed vertical cross-sectional view of a leak repair clamp constructed according to the present invention mounted on a pipeline to seal a pipe flange leak.

As shown in FIG. 2, the leak repair clamp of FIG. 1 is shown positioned in end-to-end relation about a pipeline 30 and, more specifically, about adjacent abutting pipe flanges 32. Flanges 32 of pipe 30 are held securely together by means of a flange bolt 34 and flange bolt nuts 36. A flange gasket 38 is located between the raised end faces of flanges 32 and compressed therebetween for sealing the two pipeline sections 30 together. If a leak develops through gasket 38, the leak repair clamp seals such leak when positioned about the flanges as illustrated. Frame segments 10 are positioned and centered about the periphery of adjacent pipe flanges 32 with tip portions 18 and 20 of spaced annular lips 12 and 14 in contact with the outer surface of pipe flanges 32. Bolts 34 are extended through holes 24 and nuts 36 screwed thereto, to bring the end faces of segments 10 into sealing engagement and to provide a compressive force from lips 12 and 14 to the outer surface of pipe flanges 32 and effectuate an annular recess enclosing the pipe flanges between the lips 12 and 14. A liquid sealant is then introduced into the annular recess by means of a pressurized system (not shown), which can be fitted to the threaded end of nipples 28. Thus, the liquid sealant is forced against lips 12 and 14 to provide a firm contact from tip portions 18 and 20 against the outer periphery of flanges 32 and thereby create a self-energizing seal.

Figure 3:
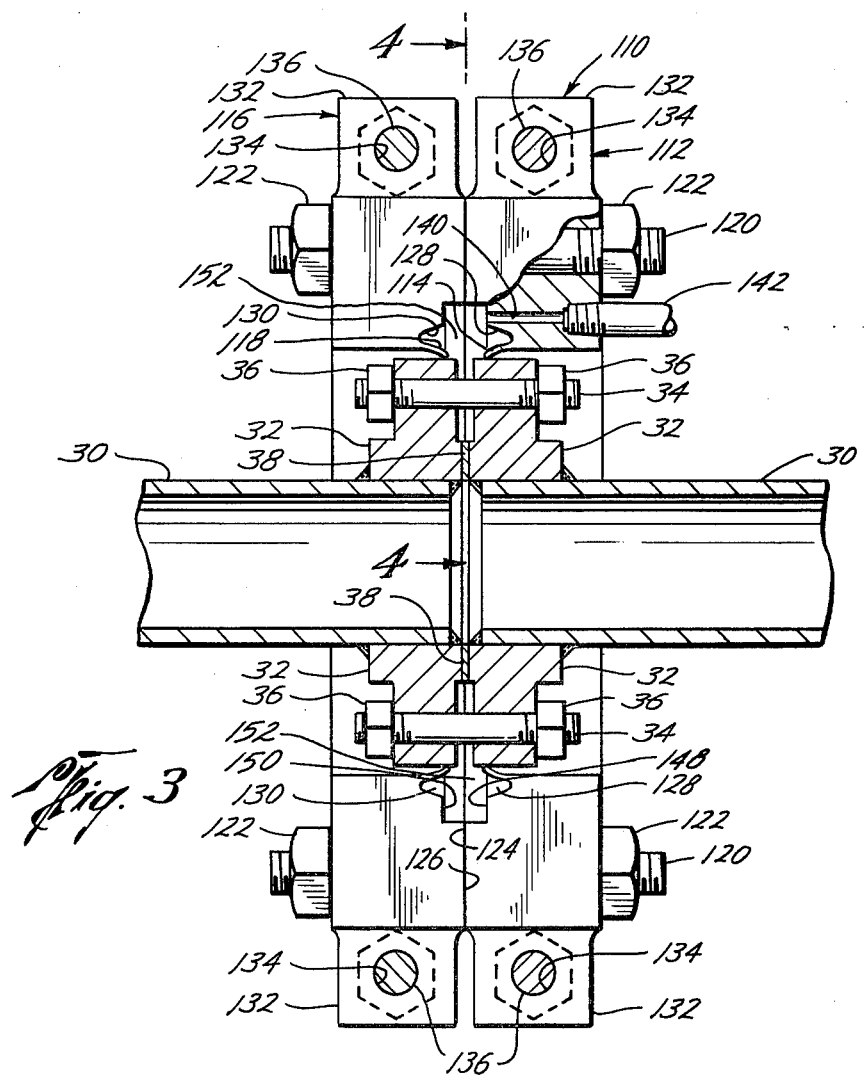
FIG. 3 is a detailed vertical cross-sectional view of a second leak repair clamp constructed according to the present invention mounted on a pipeline to seal a pipe flange leak.
Figure 4:
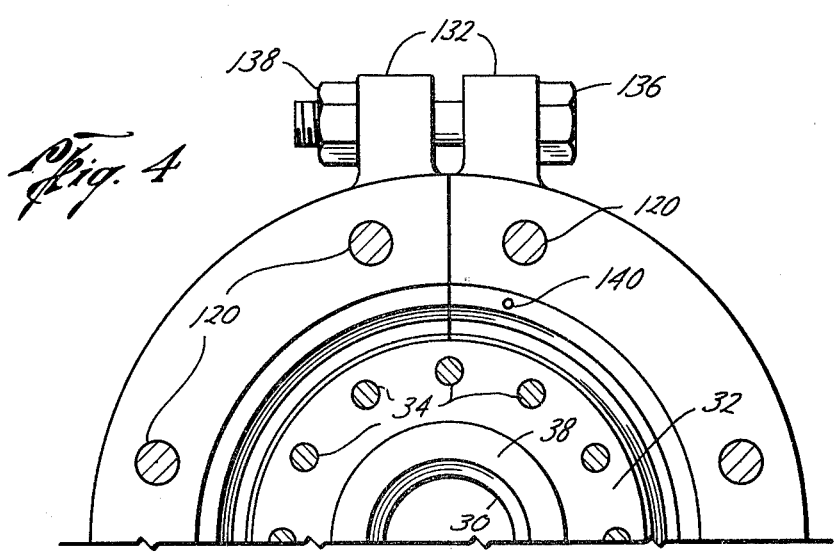
FIG. 4 is a detailed vertical cross-sectional view taken in the direction of arrow 2—2 of the leak repair clamp shown in FIG. 3.

The embodiment shown in FIGS. 3 and 4 has frame segments 110 which seal the leak in a pipe flange connection which is described with respect to the embodiment of the invention shown in FIG. 2, the reference numerals identifying the same pipe flange connecting elements. In this embodiment, frame segments 110 are preferably semi-circular and have a first section 112 which integrally supports a first lip 114 and a second section 116 which integrally supports a second lip 118.

Sections 112 and 116 are joined by a mechanism to provide single sealing frame segment 110. This mechanism is preferably a bolt 120 running through matching bolt holes located in first and second sections 112 and 116 and threadedly connected to nuts 122. For ease in manufacturing, it is preferred that first section 112 has a surface 124 extending transversely relative to its inner periphery and second section 116 has a matching transverse surface 126 extending relative to its inner periphery for butting against transverse surface 124 of first section 112. Thus, first section 112 and second section 116 are metal-to-metal sealingly joined by bolt 120 and nuts 122.

First lip 114 may flare from the inner periphery of section 112 as described for lip 12 of segment 10 and second lip 118 may flare from the inner periphery of section 116 as described for lip 14 of segment 10. However, as shown in FIGS. 3 and 4, first lip 114 may flare from the inner periphery of section 112 while forming an edge of a channel 128 disposed within the section and second lip 118 may flare from the inner periphery of section 116 while forming an edge of a channel 130 disposed within the section. Although channels 128 and 130 may be disposed within transverse surfaces 124 and 126, respectively, it is preferred that channels 128 and 130 be disposed in surfaces 148 and 150, respectively, which are inset from surfaces 124 and 126. Such construction aids in increasing the size of an annular recess 152 formed around the pipe and pipe flange and the like.

The means for connecting frame segments 110 to one another when positioned in end-to-end relation about the pipe is preferably an end flange 132 positioned on each end of semi-circular segments 112 and 116 which has an aperture or bolt hole 134 extending therethrough. Thus, each section 110 is connected to another section 110 by using bolts 136 and nuts 138.

The liquid sealant access means of this embodiment preferably permits access to the recess 152 by use of a port or passageway 140, which extends from the recess outwardly through first section 112. A tube 142 leading from liquid sealant supply system threadedly engages first section 112 to permit liquid sealant communication into the recess 152.

To position the leak repair clamp on the pipe and pipe flange and the like, sections 112 and 116 are joined together, as by bolting with bolt 120 and nutes 122. Each segment 110 is positioned in end-to-end relation about pipeline 30 similar to the positioning of segments 10 and connected to one another with bolts 136 and nuts 138. The liquid sealant is introduced into the annular recess 152 by means of the supply system via tube 142, the liquid sealant coacting with lips 114 and 118 to thereby form a self-energizing seal within the annular recess.

As shown in FIGS. 5 and 6, the leak repair clamp may be mounted directly to pipe 30 and around the flange connection to prevent a leak from the flange. The leak repair clamp uses a plurality of frame segments 210 positionable in end-to-end relation around pipe 30. Spaced parallel annular lips 212 and 214 are integrally supported on each section of segment 210. As shown in FIG. 5, lips 212 and 214 may be constructed similar to that described with respect to the embodiment shown in FIGS. 1 and 2. Or, as shown in FIG. 6, lips 212 and 214 may be constructed similar to that described with respect to the embodiment shown in FIGS. 3 and 4. In the latter case, lip 212 would form an edge of a channel 216 disposed in one section and lip 214 would form an edge of a channel (not shown) disposed in the other section.

The means for connecting the first section to the second section in this embodiment includes a semi-cylindrical plate 220 welded to the first and second sections.

The means for connecting frame segments 210 to one another embodies an end flange 222 positioned on each end of each segment, which has bolt holes with bolts 224 provided therein. Thus, segments 12 are connectable one to another when positioned in end-to-end relation around the pipe.

The access means 226 in this embodiment is similar to that described in the embodiment shown in FIGS. 3 and 4 and permits liquid sealant access into the annular recess 152 formed by the first and second sections and plate 220 to thereby form the self-energizing seal directly onto pipe 30.

As shown in FIGS. 7 and 8, another embodiment used to prevent leaks around a flange connection is illustrated. In this embodiment, a seal is provided around the pipe without contact between the sealant and the flange with each segment having connection. This is accomplished using semi-circular segments 310, a first section 312 integrally supporting a first lip 314 attached to a third section 316 integrally supporting a lip 318 with a tip portion of lips 314 and 318 bent over in order to extend toward the other lip to form a first annular recess 340. Also, each segment 310 has a second section 320 integrally supporting a second lip 322 attached to a fourth section 324 integrally supporting a lip 326 with a tip portion of lips 322 and 326 bent over in order to extend toward the other lip to form a second annular recess 324. As shown in FIG. 7, lips 314 and 318 forming the first annular recess 340 and lips 322 and 326 forming the second annular recess 342 may be constructed similar to that described with respect to the embodiment shown in FIGS. 1 and 2. Or, as shown in FIG. 8, lips 314 and 318 and lips 322 and 326 may be constructed similar to that described with respect to the embodiment shown in FIGS. 3 and 4. In the latter case, lip 314 forms an edge of a channel 328 disposed in section 312, lip 318 forms an edge of a channel 330 disposed in section 316, lip 322 forms an edge of a channel (not shown) in section 320 and lip 326 forms an edge of a channel (not shown) in section 324.

The means for connecting first section 312 to section 320 in this embodiment, includes a semi-cylindrical plate 334 welded to third section 316 and fourth section 324. Thus, the third and fourth sections are a part of the connecting means.

The means for connecting frame segments 310 to one another embodies an end flange 336 positioned on each end of each segment. Matching bolt holes with bolts 338 extending therethrough are provided in each end flange 336 for connecting the frame segments when positioned in end-to-end relation around pipe 30.

An access means 332 is provided in first sections 312 and second sections 320 to permit liquid sealant access into the first and second annular recesses and seal the lips to the pipe.

Thus, it is apparent that there has been provided, in accordance with the invention, a leak repair clamp that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A leak repair clamp for pipe and pipe flanges and the like, comprising:
   a frame having a plurality of frame segments positionable in end-to-end relation about the pipe, each segment having integrally spaced parallel annular lips flaring from its inner periphery and having a tip portion bent over in order to extend toward the other tip portion, said plurality of frame segments including:
   (i) a first section integrally supporting a first of the spaced parallel lips,
   (ii) a second section integrally supporting a second of the spaced parallel lips, and
   (iii) means for connecting the first section to the second section to thereby make each frame segment with spaced parallel annular lips; means for connecting the frame segments to one another when positioned in end-to-end relation, the spaced lips extending from said frame segments to form an annular recess around the pipe when the pipe segments are connected, said segment connecting means including a flange on each end of each segment for disposal adjacent the flange of an adjacent segment, the end faces of said segments being brought into sealing engagement with one another when the frame segments are connected; and
   access means provided in said frame for permitting passage of a liquid sealant into the recess, the lips directing the flow of sealant into contact with the pipe to form a self-energizing seal between the lips and pipe.

2. the leak repair clamp of claim 1, wherein said access means includes injection port means mounted within said first section of each segment for permitting the liquid sealant to be injected into the sealing cavity.

3. The leak repair clamp of claim 2, wherein said access means includes injection port means mounted within said second section of each segment for permitting the liquid sealant to be injected into the sealing cavity.

4. The leak repair clamp of claim 1, wherein said connecting means includes a bolt running through matching bolt holes located in said first and second sections for holding mating surfaces on each sections in butting engagement with one another.

5. The leak repair clamp of claim 1, wherein said first section has a surface extending transversely relative to its inner periphery and said second section has a transverse surface for butting against the transverse surface of said first section when the sections are joined.

6. The leak repair clamp of claim 5, wherein the first lip supported by said first section forms an edge of a channel disposed within the transverse surface of the first section and the second lip supported by said second section forms an edge of a channel disposed within the transverse surface of the second section, the channels in the sections being a part of the annular recess formed around the pipe.

7. The leak repair clamp of claim 5, wherein each section includes a surface inset from the transverse surface and the channel is disposed within the inset surface.

8. The leak repair clamp of claim 1, wherein said connecting means includes a third section to which said first section is connected, the third section having a third lip flaring from its inner periphery, the lip being an integral part of the third section and having a tip portion bent over toward the tip portion of the first lip to form a first recess between the lips of the first and third sections and a fourth section to which said second is connected, the fourth section having a fourth lip flaring from its inner periphery, the lip being an integral part of the fourth section and having a tip portion bent over toward the tip portion of the second lip to form a second recess between the lips and channels of the second and fourth sections; and said access means includes means for permitting passage of the liquid sealant to the first and second recesses.

9. The leak repair clamp of claim 8, wherein said access means includes injection port means mounted within said first and second sections for injecting the liquid sealant into the first and second recesses.

10. The leak repair clamp of claim 8, wherein said first section has a surface extending transversely relative to its inner periphery, and the first lip forms an edge of a channel disposed within its transverse surface and said third section has a transverse surface for butting against the surface of the first section and the third lip forms an edge of a channel disposed within its transverse surface to thereby form a part of the first annular recess, said second section has a surface extending transversely relative to its inner periphery and the second lip forms an edge of a channel disposed within its transverse surface and said fourth section has a transverse surface for butting against the surface of the second section and the fourth lip forms an edge of a channel disposed within its transverse surface to thereby form a part of the second annular recess.

11. The leak repair clamp of claim 1, wherein the segment connecting means includes a flange on each end of each section for disposal adjacent the flange of an adjacent section, the end faces of said sections being brought into sealing engagement with one another when the frame segments are connected, said connecting means includes a bolt running through matching bolt holes located in each section for holding a transverse surface on each section in butting engagement with another section, said access means includes injection port means mounted within each section for injecting the liquid sealant into the recess, and each section has a surface inset from the transverse surfaces, the lips of each section forming an edge of a channel disposed within its inset surface, to thereby form a part of the annular recess when the segments are connected to one another.

* * * * *